July 16, 1963 L. T. SKEGGS 3,097,927
CHROMATOGRAPHY ANALYSIS APPARATUS AND METHOD
Filed July 21, 1959 2 Sheets-Sheet 1

INVENTOR.
LEONARD T. SKEGGS
BY
ATTORNEY

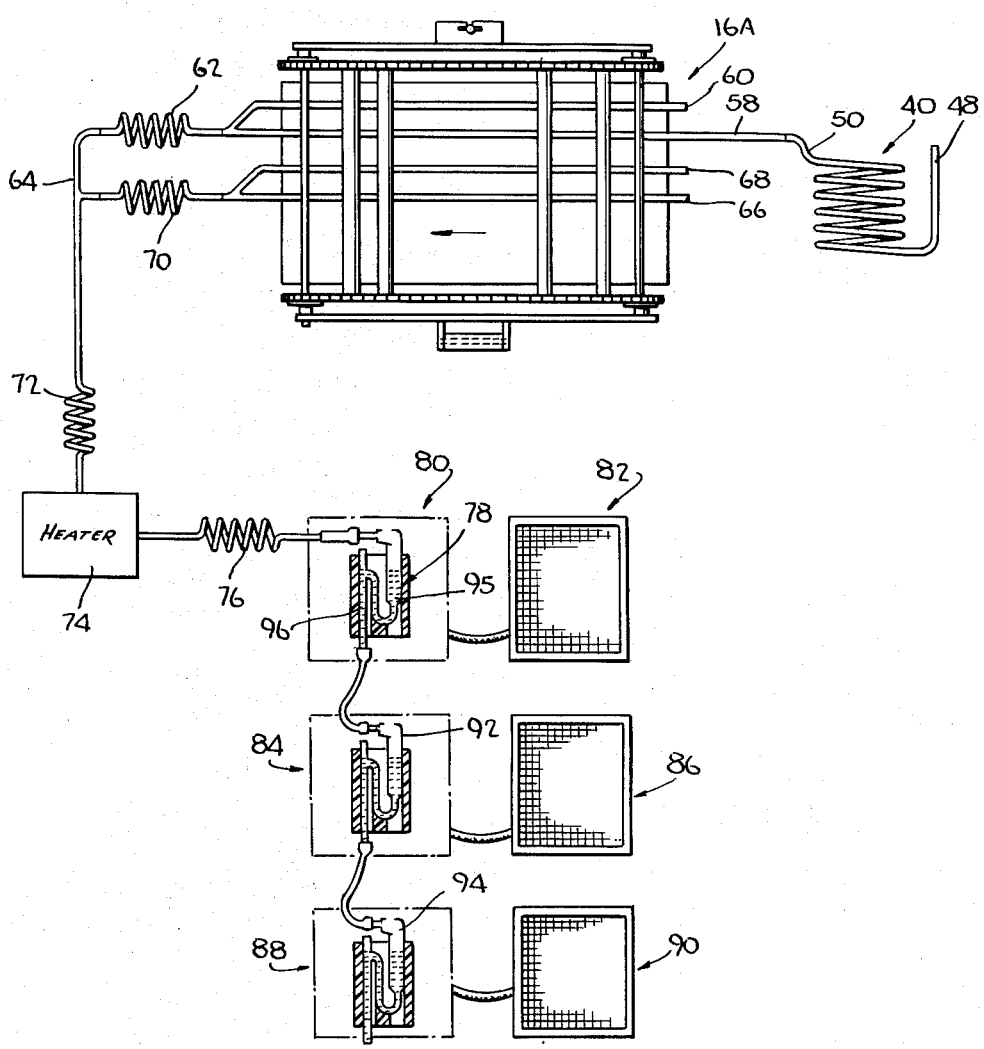

United States Patent Office 3,097,927
Patented July 16, 1963

3,097,927
CHROMATOGRAPHY ANALYSIS APPARATUS AND METHOD
Leonard T. Skeggs, Cleveland, Ohio, assignor to Technicon Instruments Corporation, Chauncey, N.Y., a corporation of New York
Filed July 21, 1959, Ser. No. 828,582
3 Claims. (Cl. 23—230)

This invention relates to a method and apparatus for continuous chromatographic analysis.

In accordance with the present invention and pursuant to the primary object thereof, the eluents from one or more adsorption or chromatography columns are collected in lengths of tubing, respectively, for subsequent colorimetric analysis of the eluents collected in said lengths of tubing, respectively.

It has been proposed heretofore to transmit the eluent automatically and continuously as it flows from the chromatography column, in the stripping operation, to apparatus wherein the successive flowing portions of the eluents are treated for colorimetric analysis, for example, as in the chromatographic analysis of amino acids. In accordance with said previously proposed method, a proportioning pump is employed to pump the eluting liquid to the top of a chromatography column and to pump the eluent from the column together with a diluent and a color developing reagent through mixing coils, through a heater and to the flow cell of a colorimeter. Due to the fact that the flow of the eluent from the chromatography column is rather slow, the operation of the automatic analysis apparatus comprising the pump, mixing coils, heater, colorimeter, and the recorder operable under the control of the colorimeter was necessarily slowed down, with the result that the automatic analysis apparatus was rendered unavailable for other uses for considerable periods of time. In other words, the slow rate of flow of the eluent from the chromatography column, in the stripping operation, "tied up" the automatic analysis apparatus for comparatively long periods of time.

The above disadvantage of prior methods of automatic chromatography analysis is obviated by the present invention. In accordance with the present invention, briefly described, the eluent from the chromatography column, instead of being transmitted to the analysis apparatus, concurrently with the flow of the eluent from the column, as heretofore proposed, is collected and stored in a length of tubing into which the eluent is pumped as it flows from the column, and further, in accordance with the preferred mode of practicing this invention, air is pumped into the eluent as it flows from the column for forming in the length of tubing segments of the liquid eluent separated from each other by the segments of air. The eluent thus collected in the length of tubing may be kept therein for any period of time or until the automatic analysis apparatus is available, and at that time the length of tubing may be connected to the automatic analysis apparatus for analysis of the eluent previously collected and stored in said length of tubing.

The above and other objects, features and advantages of this invention will be more fully understood from the following description considered in connection with the accompanying illustrative drawings.

In the drawings:

FIG. 3 is a schematic and partly diagrammatic illustration of automatic analysis apparatus having the eluent collection tubing connected thereto for the automatic analysis of the eluent; and FIG. 4 is a longitudinal sectional view on a larger scale illustrating the segmentized eluent in the length of tubing.

Figure 1:
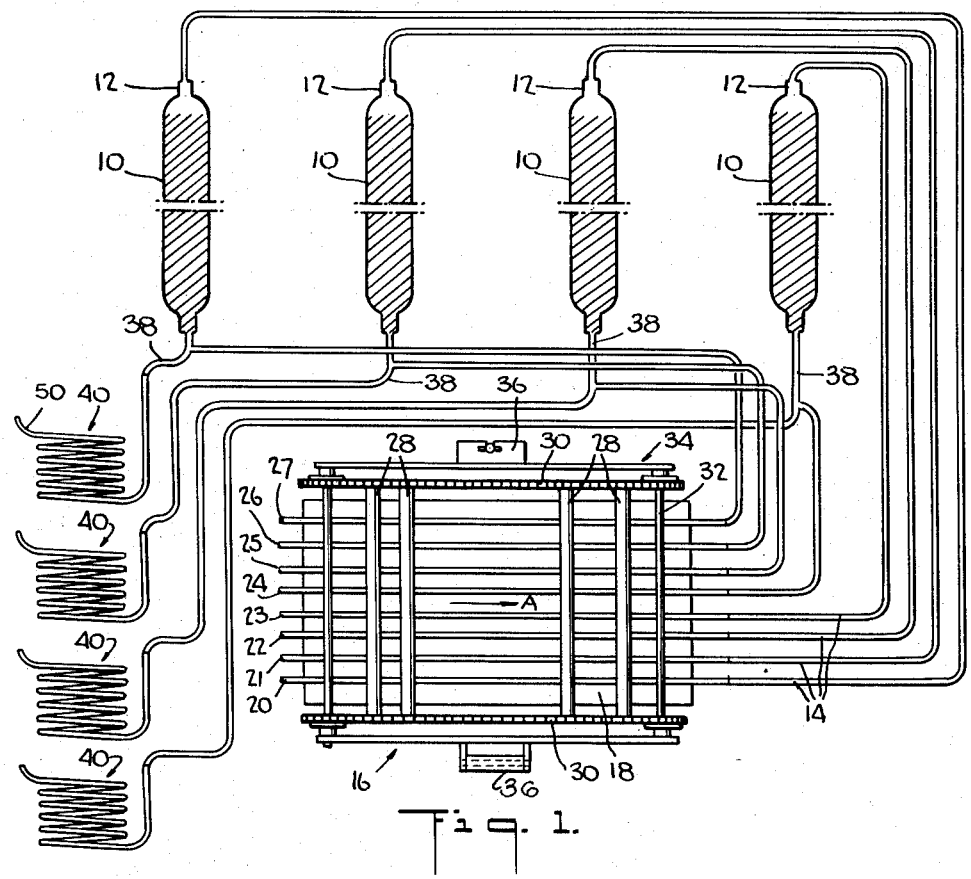
FIG. 1 is a schematic and partly diagrammatic illustration of apparatus in accordance with the invention.
Figure 2:
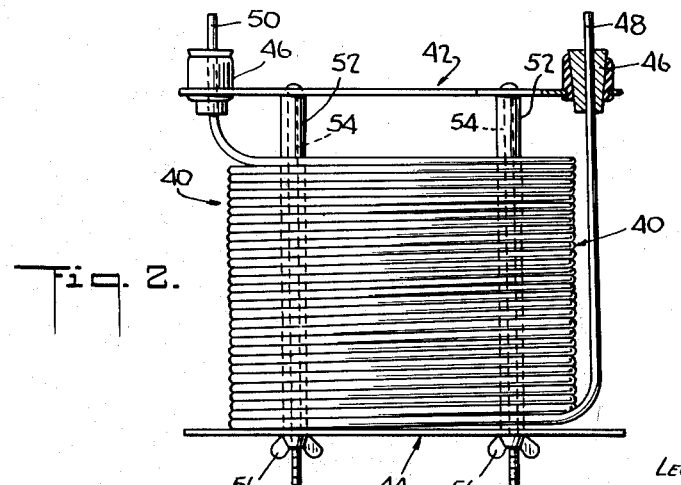
FIG. 2 is a side view of a length of tubing, in the form of a coil, for collecting eluent from a chromatography column.

Referring now to the drawings in detail and first to FIGS. 1 and 2, each of a plurality of individual chromatography columns 10 is provided with an upper inlet 12 for the eluting liquid which is pumped into the top of the column for the stripping operation through a companion tube 14. The pump is indicated at 16 and preferably is a proportioning pump of the type shown in United States Patent No. 2,893,324. Briefly described, said pump comprises a platen 18 on which a series of resiliently compressible tubes here numbered 20 through 27, respectively, are disposed in parallel spaced relation and which are simultaneously compressed progressively along their lengths by pressure rollers 28 which are carried by endless sprocket chains 30 operated by a suitable driving gear connected to one of the sprocket wheel shafts 32. Said rollers are mounted in a frame 34 which is movable about a horizontal pivot indicated at 36 from a position in which the pressure rollers engage the resiliently compressible tubes to a retracted position away from the platen for insertion and removal of the tubes when necessary. The tubes may have the same or different internal diameters for supplying the various fluids in predetermined proportions, but all said tubes, even though of different internal diameters, have the same wall thickness so that they are all fully compressed simultaneously progressively along their lengths while the rollers move in the direction of the arrow A (FIG. 1) in engagement with all of said tubes.

As illustrated in FIG. 1, the resiliently compressible tubes 20 to 23 are connected to a companion tube 14 for pumping the eluting liquid through tube 14 to the inlet 12 of the companion chromatography column. Tubes 24 to 27 are employed for supplying air to the eluent which flows from the chromatography column into the companion outlet tube 38. The air or other inert gas which is thus pumped into the eluent divides the eluent into segments of liquid L spaced from each other longitudinally of the tubing by intervening segments G of air or other inert gas, as illustrated by FIG. 4.

In accordance with the present invention, as briefly described above, the eluent from the chromatography column is collected in a companion length of tubing which is preferably in the form of a helical glass coil indicated at 40.

Coil 40 may be supported in any suitable way. As illustrated in FIG. 2, the coil is mounted in position between upper and lower plates 42 and 44. Upper plate 42 is provided with holders 46 for the inlet and outlet ends 48 and 50 of the tubing. The plates 42 and 44 are held in spaced relation by tubular members 52 through which companion rods 54 extend and which are threaded at their lower ends for engagement by the wing nuts 56. It will be understood that the inlet 48 of each coil or length of tubing 40 is removably connected to the outlet 38 of companion chromatography column so that after the stripping operation of each column is completed, the eluent-collection tubing may be disconnected from the outlet of the chromatography column and thereafter connected to the analysis apparatus. The inlet and outlet ends of the eluent-collection tubing 40 may be provided with removable plugs for closing the opposite ends of said tubing until it is to be connected to the analysis apparatus.

Referring now to FIG. 3, there is illustrated an automatic analysis apparatus to which an eluent-collection tubing 40 is connected. Said apparatus comprises a proportioning pump 16A which is preferably of the same construction as the above-described pump 16. The outlet end 50 of tubing 40 is connected to the resiliently compressible pump tube 58 for pumping the segmentized eluent out of the said tubing 40 for analysis. Concurrently with the pumping of the eluent from tubing 40, a diluent is pumped through pump tube 60 which is connected to the inlet end of a horizontally disposed helical mixing coil 62 to which the pump tube 58 is also connected, whereby the eluent and the diluent are thoroughly mixed in their passage through said mixing coil. The outlet of the mixing coil is connected to the tube 64. Substances for treating the diluted eluent for colorimetric analysis are pumped through pump tubes 66 and 68 to the inlet of the mixing coil 70 which is connected to tube 64 which is connected to a mixing coil 72.

When the eluent from a column 10 contains an amino acid which is to be analyzed colorimetrically for providing one or more chromatograms, the diluent supplied by tube 60 is methyl Cellosolve and the color reagent is ninhydrin in the presence of hydrindantin as a reducing agent, the ninhydrin and the hydrindantin being supplied by the pump tubes 66 and 68, respectively, and the resulting color reagent is mixed with the eluent in the mixing coil 72. The air which is introduced into the tubing 40 for segmentizing the eluent may be washed with $H_2SO_4$ to remove $NH_3$ and thus obviate reaction with the color reagent.

Reference has been made, for the purposes of illustration, to specific chromatographic analysis such as that of amino acids, but it will be understood that this invention is not specifically concerned with any particular analysis in respect to the chemistry thereof but, on the contrary, relates broadly to chromatographic analysis of various eluents from a chromatography column involving the use of lengths of tubing for collecting the eluent from a companion column and the attachment of the length of tubing to the analysis apparatus at a convenient time. It is to be understood that the principles of chemistry or the specific methods are not in themselves part of the present invention and therefore need not be described herein; they are known principles and methods but are applied and performed by the method and apparatus according to the present invention.

In the operation of the analysis apparatus illustrated by FIG. 3 as partly described above, the mixture of the color reagent and diluted eluent flows to the heating bath 74 which operates at a temperature of 95° C. to produce a color change in the eluent for colorimetric analysis thereof. After this treatment in the heating bath 74, the eluent passes through a cooling coil 76 and from the latter to the flow cell 78 of the colorimeter 80 which operates a companion recorder 82 to provide a record of the analysis.

As illustrated, additional colorimeter recorders 84, 86 and 88, 90 are provided with the flow cells 92 and 94 of colorimeters 84 and 88 in series with each other and with the flow cell 78 of the first colorimeter 96. The light sources of these colorimeters are of different wave lengths, respectively, in accordance with known practice so that chromatograms of different constituents in the eluent are formed on the recorders 82, 86 and 90 as a result of the flow of the eluent in succession through the flow cells 78, 92 and 94 in series.

An apparatus and method for use in the chromatography of amino acids are described in an article published in "Analytical Chemistry," volume 30, Number 7, pages 1190–1206, July 1958, in a paper entitled "Automatic Recording Apparatus for Use in the Chromatography of Amino Acids," by Darrel H. Spackman, William H. Stein and Stanford Moore, The Rockefeller Institute for Medical Research, New York 21, N.Y. The apparatus and method of my invention, while useful for other purposes, may be employed for performing the chromatography of amino acids according to the chemical principles described in said paper of Spackman, Stein and Moore.

It will be understood that the segmental liquid stream which flows into the flow cell of the colorimeter 80 is freed of the air or gas segments, by reason of the fact that the upper or inlet end of the flow cell is open, and it will be further understood that the liquid segments which flow downwardly into the leg 95 of the flow cell are blended therein and then flow upwardly into the other leg 96 of the flow cell which is also open at the top. Flow cells 92 and 94 are of the same construction as flow cell 78.

Referring to FIG. 1 of the drawings, it is to be noted that during the operation of the apparatus for collecting the eluents in the coils 40, the outlet end 50 of each coil of tubing is open and thus provides a vent which allows the free flow of the segmentized eluent stream into the collection tubing. With further reference to the segmentizing of the eluent by the air introduced by the pump tubes 24 to 27, respectively, it is to be noted that the successive portions of the eluent from the chromatography column are prevented from diffusing into each other, so that when at a later time the collection tubing 40 is connected to the analysis apparatus illustrated in FIG. 3, the analysis will correspond to the successive portions or fractions of the eluent transmitted from the chromatography column to the companion collection tubing 40. It wil be understood that when the collection tubing 40 is connected to the pump 16A of the analysis apparatus, the end 48 is open to the atmosphere.

While I have shown and described the preferred mode of practicing my invention, it will be understood that various changes may be made therein and will occur to skilled artisans in view of the present disclosure. Accordingly, I do not wish to be limited to the invention as herein specifically illustrated or described, except to the extent which may be required by the scope of the appended claims.

What I claim is:

1. In chromatography analysis apparatus which is provided with a chromatography column having an upper inlet for the supply of an eluting liquid thereto and with a lower outlet for the discharge of eluent from the column, means for receiving the eluent during the discharge thereof from the outlet of the column and for storing the eluent for subsequent supply to an automatic analysis apparatus, said receiving and storing means comprising a length of tubing having an inlet detachably connected to said outlet of the column and having an air vent at a point remote from said inlet of said tubing and positioned a sufficinet distance from said inlet of said tubing to provide for the collection of substantially all of the eluent from the column in said length of tubing between its said inlet and said air vent, and means for introducing an inert gas into the discharged eluent before it enters said length of tubing for subdividing the eluent into segments spaced from each other longitudinally of said tubing by intervening segments of said gas and thereby preventing diffusion of successive portions of the eluent with each other in said length of tubing.

2. In chromatography analysis apparatus which is provided with a chromatography column having an upper inlet for the supply of an eluting liquid thereto and with a lower outlet for the discharge of eluent from the column, means for receiving the eluent during the discharge thereof from the outlet of the column and for storing the eluent for subsequent supply to an automatic analysis apparatus, said receiving and storing means comprising a length of tubing having an inlet detachably connected to said outlet of the column and having an air vent at a point remote from said inlet of said tubing and positioned a sufficient distance from said inlet of said tubing to provide for the collection of substantially all of the eluent from the column in said length of tubing between its said inlet and said air vent, at least a part of said length of tubing having a coiled formation, and means for introducing an inert gas into the discharged eluent before it enters said length of tubing for subdividing the eluent into segments spaced from each other longitudinally of said tubing by intervening segments of said gas and thereby preventing diffusion of successive portions of the eluent with each other in said length of tubing.

3. A method of chromatography analysis according to which there is provided a chromatography column having an upper inlet for the supply of an eluting liquid to the column and having a lower outlet for the discharge of eluent from the column and according to which there is employed an automatic analysis apparatus for analyzing the eluent discharging from said column, said method comprising detachably connecting a length of tubing to the outlet of said column for collecting and storing the eluent discharged from the column through said outlet, introducing an inert gas into the eluent as it flows from the outlet of said column into said length of tubing and thereby forming the eluent into a stream of successive segments of eluent spaced from each other in the line of flow by intervening segments of said gas, whereby diffusion of successive portions of the eluent with each other in said length of tubing is prevented, and thereafter connecting said tubing to said automatic analysis apparatus for the analysis of the eluent collected in said tubing.

References Cited in the file of this patent

UNITED STATES PATENTS

| | | |
|---|---|---|
| 2,710,715 | Gorham | June 14, 1955 |
| 2,797,149 | Skeggs | June 25, 1957 |
| 2,899,280 | Whitehead | Aug. 11, 1959 |

OTHER REFERENCES

Spackman: Anal. Chem., 1958, vol. 30, pp. 1190–1206.